(12) United States Patent
Muench et al.

(10) Patent No.: US 9,521,805 B2
(45) Date of Patent: Dec. 20, 2016

(54) HARVESTER WITH PREDICTIVE DRIVING SPEED SPECIFICATION

(71) Applicant: DEERE & COMPANY, Moline, IL (US)

(72) Inventors: Phillip Muench, Kaiserslautern (DE); Habib Ribess Bianda Seunou, Kaiserslautern (DE); Benedikt Jung, Kaiserslautern (DE)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 14/643,566

(22) Filed: Mar. 10, 2015

(65) Prior Publication Data

US 2015/0264863 A1 Sep. 24, 2015

(30) Foreign Application Priority Data

Mar. 20, 2014 (DE) .................. 10 2014 205 233

(51) Int. Cl.
*A01D 41/02* (2006.01)
*A01D 41/127* (2006.01)
*G06N 5/04* (2006.01)

(52) U.S. Cl.
CPC ............ *A01D 41/127* (2013.01); *A01D 41/02* (2013.01); *A01D 41/1271* (2013.01); *G06N 5/04* (2013.01)

(58) Field of Classification Search
CPC .. A01D 41/127; A01D 41/02; A01D 41/1271; G06N 5/04
USPC .......................................................... 701/50
See application file for complete search history.

(56) References Cited

U.S. PATENT DOCUMENTS

| 4,487,002 | A | * | 12/1984 | Kruse | A01D 41/1274 460/6 |
| 4,513,562 | A | * | 4/1985 | Strubbe | A01D 41/127 56/10.2 G |
| 5,995,895 | A | * | 11/1999 | Watt | A01B 79/005 56/10.2 G |
| 6,315,658 | B1 | * | 11/2001 | Weber | A01D 41/127 460/6 |
| 6,487,836 | B1 | * | 12/2002 | Coers | A01D 41/127 460/7 |
| 9,072,223 | B2 | * | 7/2015 | Baumgarten | A01D 41/127 |

(Continued)

FOREIGN PATENT DOCUMENTS

| DE | 1199039 B | 8/1965 |
| DE | 4431824 C1 | 5/1996 |

(Continued)

OTHER PUBLICATIONS

European Search Report issued in counterpart application No. 15154983.9, dated Jul. 22, 2015 (7 pages).

*Primary Examiner* — Behrang Badii
*Assistant Examiner* — Michael Berns
(74) *Attorney, Agent, or Firm* — Yee & Associates, P.C.

(57) ABSTRACT

An apparatus and a method for the speed control of a harvester, in which the density of a crop planting on the field is predictively determined and a speed specification signal for the harvester is planned, in the sense of a continued maintenance of a desired throughput of the harvester, wherein with the predictive planning of the speed specification signal, the accelerations of the harvester are limited to an extent that is comfortable for an operator of the harvester.

9 Claims, 6 Drawing Sheets

(56) References Cited

U.S. PATENT DOCUMENTS

2003/0004630 A1* 1/2003 Beck ................ A01D 41/127
 701/50
2014/0338298 A1* 11/2014 Jung ................ A01D 41/127
 56/10.2 R

FOREIGN PATENT DOCUMENTS

| DE | 10130665 A1 | 1/2003 |
|---|---|---|
| DE | 102006037631 A1 | 2/2008 |
| EP | 1243173 A1 | 9/2002 |
| EP | 1153538 B1 | 8/2007 |
| EP | 2586286 A1 | 5/2013 |
| EP | 2803256 A1 | 11/2014 |

* cited by examiner

HARVESTER WITH PREDICTIVE DRIVING SPEED SPECIFICATION

CROSS-REFERENCE TO RELATED APPLICATIONS

Pursuant to 35 USC §119, this application claims the benefit of and priority to German patent application no. 102014205233.5, filed on Mar. 20, 2014, which is herein incorporated by reference in its entirety.

TECHNICAL FIELD

The invention concerns a method and an apparatus for the speed control of a harvester.

BACKGROUND

With agricultural harvesters, the throughput depends, proportionally, on the individual driving speed of the harvester. In order to use the harvester to capacity in the best way possible and to effectively utilize it, systems are known that automatically set the driving speed in the sense of maintenance of a desired crop throughput and to relieve the operator of the task of speed specification.

The density of the crops can vary with greater or lesser intensity on a field, which results in corresponding changes of the driving speed. The recording of the density, in particular, if it takes place on board the harvester by means of a throughput sensor (see, for example, DE 1 199 039 B), and the speed adaptation subsequent to a density change, require, however, a certain reaction time, which leads to a situation where the speed can be adapted to a change of the density of the crops on the field with only a temporary deceleration. This is particularly critical if the density suddenly undergoes a great increase, since then an overloading or clogging of the harvester may even result.

In the state of the art, solutions have been proposed in which the density of the crops on the field or a value dependent thereon is predictively determined and the driving speed specification is derived therefrom in such a manner that the harvester travels already at a suitable speed upon reaching a certain point of the field, whether by means of a card produced with a prior harvesting operation (DE 44 31 824 C1) or by means of a predictively operating sensor for the recording of the planting density (DE 101 30 665 A1). These solutions, however, have the disadvantage that more or less intense accelerations of the harvester continuously occur which, in any case, make themselves noticeable to the driver as strenuous and uncomfortable after long workdays.

A limitation of the available acceleration of a harvester for the purpose of improving the control of the operator is in fact known, in that the adjustment speed of an actuator defining the driving speed is hydraulically limited (DE 10 2006 037 631 A1), but a use of such a limitation with a predictively speed-controlled harvester would again lead to the problem that the crop throughput does not always agree with the theoretical value. In particular, the case can occur that with a sudden greatly increasing crop density, a sufficiently strong deceleration does not occur, so that the harvester is clogged or overloaded.

SUMMARY

The goal that is the basis of the invention is to be found in making available a harvester with a predictively operating speed specification, in which, on the one hand, the accelerations occurring in operation are limited to a comfortable degree, but, on the other hand, are guaranteed so that a desired throughput value is maintained as well as possible without exceeding it.

The invention under consideration is defined by the patent claims.

A method for the speed control of a harvester that can move forward over a field in a forward direction at a driving speed, and thereby picks up crops, comprises the following steps:

predictive determination of the density of a crop planting on the field or a value dependent on the density of the crop planting on the field;

advance planning of a speed specification signal for the harvester, in the sense of a continuous maintenance of a desired throughput of the harvester;

wherein with the advance planning of the speed specification signal, the accelerations of the harvester resulting from the speed specification signal are limited to a degree that is comfortable for an operator of the harvester;

and control of the speed of the harvester, based on the speed specification signal.

In other words, a planning of the speed takes place, which takes into consideration two boundary conditions: the desired throughput should be maintained at least to the extent that, in particular, an exceeding of a planned quantity of the throughput is avoided, but the amount of the acceleration of the harvester should not rise beyond a stipulated level of comfort. In this way, a gain of comfort for the operator of the harvester is attained, without the other boundary condition of the maintenance of the desired throughput being violated at least to an approximate, specifiable extent. The desired crop throughput can be firmly specified or be selected by an operator, for example, in that he inputs a target value for the throughput, or in the case of a combine harvester, a loss value, which in turn determines the throughput.

Preferably, the advance planning of the speed specification signal comprises a first step, in which the speed signal is planned only on the basis of the density of the crops or a value dependent thereon, and a second step, in which a new planning is carried out, if the amount of the acceleration of the harvester planned in the first step exceeds a stipulated threshold value. In this way, a greater calculation effort is not necessary if the planting density is relatively homogeneous. On the other hand, the original planning is modified in the sense of maintaining the limiting value of the acceleration.

In the advance planning of the speed specification signal, a maximum speed of the harvester can also be taken into consideration. The advance planning of the speed specification signal can comprise a step for the purpose, in which a new planning takes place if the speed of the harvester planned in the first step exceeds a stipulated maximum speed of the harvester.

The advance planning of the speed specification signal can comprise a movement in time of a speed change forward or backward, so as to prevent an exceeding of a threshold value of the acceleration and/or speed. Accordingly, the speed change, if required, takes place earlier than originally planned, so as to reduce an acceleration or deceleration that is to be carried out otherwise. On the basis of the limited speed or deceleration, the end of the speed change maneuver can analogously be pushed back in time. Since this operation lasts longer than was originally planned, speed specification signals following the new planning in time are appropriately moved back in time, so that the aforementioned speed specification signals following the new planning are also used at the spatial points for which they were originally planned.

In the new planning of a speed signal that originally exceeded a maximum acceleration or speed, a maximum acceleration or speed can be used.

An apparatus for the speed control of a harvester that can move over a field at a driving speed in a forward direction and thereby picks up crops comprises the following:

a device for the predictive determination of the density of the crop planting on the field or a value dependent on the density of the crop planting on the field;

a planning device for the predictive planning of a speed specification signal for the harvester, in the sense of a continuous maintenance of a desired throughput of the harvester;

wherein the planning device can be operated, with a predictive planning of the speed specification signal, so as to limit the accelerations of the harvester resulting from the speed specification signal to an extent that is comfortable for an operator of the harvester;

and means for the control of the speed of the harvester, based on the speed specification signal.

The apparatus in accordance with the invention can be used on self-propelled harvesters pulled by a vehicle or attached thereon, for example, combine harvesters, pulled or self-propelled balers or field choppers.

In the case of a harvester pulled by a towing vehicle or attached thereon, such as a baler or a field chopper, the speed of the harvester is controlled in that the travelling speed of the towing vehicle is controlled. To this end, a control of the harvester can communicate, via a bus, with a control of the towing vehicle—see EP 1 153 538 A2. The predictive determination of the density of the crop planting on the field can take place by means of elements connected with the control of the harvester and/or the control of the towing vehicle. Analogously, the specification of the travelling speed of the towing vehicle can be undertaken by the control of the harvester and/or the control of the towing vehicle. Accordingly, the entire combination can be considered the harvester, in the sense of the patent rights under consideration, with a combination of a towing vehicle and a pulled or an attached harvester.

BRIEF DESCRIPTION OF THE DRAWINGS

The detailed description of the drawings refers to the accompanying figures in which.

DETAILED DESCRIPTION OF THE DRAWINGS

Figure 1:
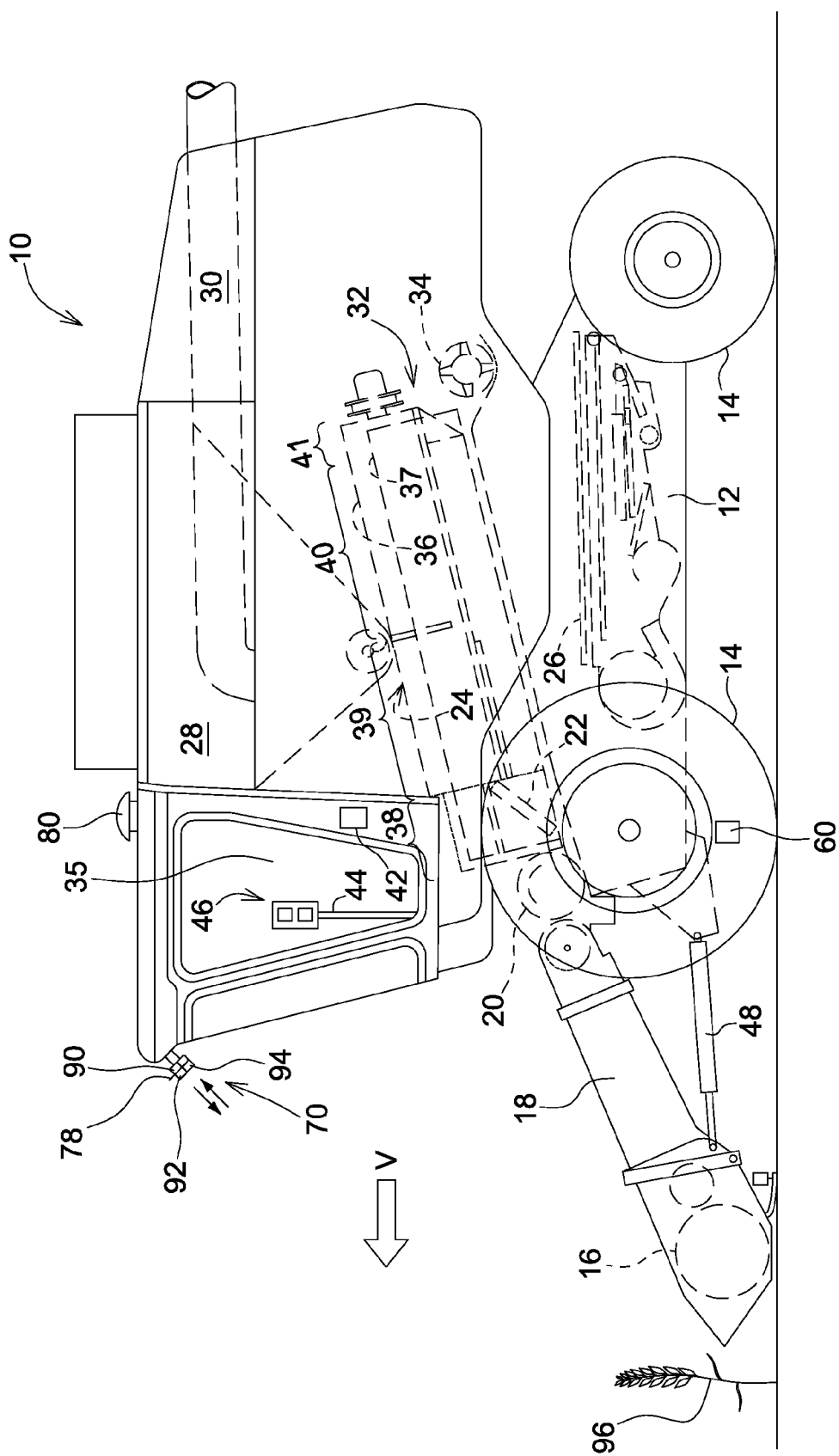
FIG. 1 shows a semi-schematic side view of an agricultural combine harvester.

FIG. 1 shows an agricultural combine harvester 10, serving as an example for a harvester, with a carrying structure 12, which is provided with wheels 14 that are engaged with the ground. Although the combine thresher 10 with wheels is shown, it could also be provided with two or four track rollers. A cutting device 16 is used for the harvesting of crops and it supplies an inclined conveyor 18. The inclined conveyor 18 contains a conveying device, so as to supply the harvested crops to a guiding drum 20. The guiding drum 20 conducts the crops upward through an inlet transition section 22 and a rotatable crop processing device 24, set up for the threshing and separating. The depicted crop processing device 24 is located axially in the combine thresher; however, it could also be located in other orientations relative to the longitudinal axis of the combine thresher 10. Although the invention under consideration is described with the aid of a crop processing device 24 with a rotor, it could also be used in a combine thresher 10 with a conventional threshing drum, arranged transversely, which works together with a threshing concave.

The crop processing device 24 threshes and separates the harvested crops. The grain and chaff fall through grates to the bottom of the crop processing device 24 into a cleaning system 26. The cleaning system 26 removes the chaff and conducts the clean grain to an elevator (not shown) for clean grain. The elevator for clean grain deposits the grain in a grain tank 28. The clean grain in the grain tank 28 can be supplied, through an unloading worm conveyor 30, to a truck or trailer.

Threshed-out straw, freed from the grain, is supplied by the crop processing device 24, through an outlet 32, to an ejection drum 34. The ejection drum 34 expels the straw, in turn, at the back of the combine thresher 10. It should be noted that the ejection drum 34 could also supply the crops freed from the grain directly to a field chopper. The operation of the combine thresher 10 is controlled from an operator's cabin 35.

The crop processing device 24 comprises a cylindrical rotor housing 36 and a rotatable rotor 37, which is situated in the rotor housing 36. The front part of the rotor 37 and the rotor housing 36 define a charging section 38. A threshing section 39, a separating section 40, and an outlet section 41 are situated downstream from the charging section 38. The rotor 37 is provided in the charging section 38 with a conical rotor drum, which has the spiral-shaped charging element for engagement in the crops which it obtains from the guiding drum 20 and from the inlet transition area 22. Directly downstream from the charging section 38, there is the threshing section 39. The rotor 37 has a cylindrical rotor drum in the threshing section 39; it is provided with a number of threshing elements, so as to thresh crops obtained from the charging section 38. Downstream from the threshing section 39, there is the separating section 40, in which the grain still contained in the threshed crops is liberated and falls into the cleaning system 26 through a bottom grate in the rotor housing 36. The separating section 40 passes over into the outlet section 41, in which the crop (straw) liberated from the grain is expelled from the crop processing device 24.

Figure 2:
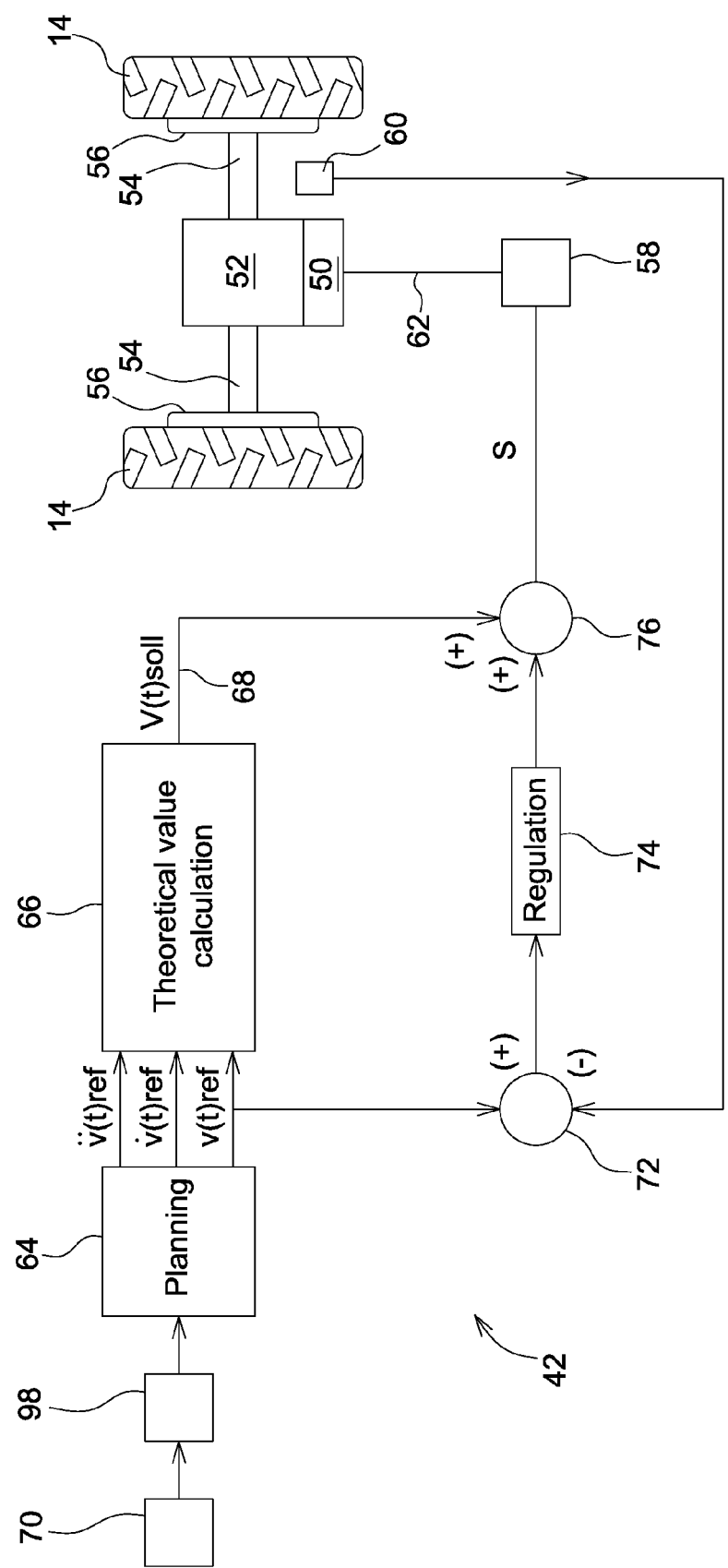
FIG. 2 shows a scheme of a throughput control system in accordance with the invention.

The front wheels 14 of the combine thresher 10 are driven by a hydrostatic gear 50, as shown in FIG. 2. The hydrostatic gear 50 is driven in a conventional manner by a combustion engine, not shown. The hydrostatic gear 50, in turn, drives a switching gear 52. Two driving shafts 54 extend from the switching gear 52 outward and drive end drives 56 of the front wheels 14. The hydrostatic gear 50 includes a pump unit and an engine unit. The pump unit and/or the engine unit are equipped with adjustable wobble plates. The adjustable wobble plates control the initial speed of the gear 50 and its rotating direction. Electromagnetically operated control valves 58 operate the positions of the wobble plates. The guidable back wheels 14 can also be driven by wheel motors that are fastened directly on the wheels 14. The speed of the wheel motors can be controlled by the throughput control system described below.

An electronic control 42 operates the driving speed v of the combine thresher 10. That means that the electronic control 42 adjusts the forward speed (harvesting speed) of the combine thresher 10 by adjusting the position of the wobble plates of the hydrostatic gear 50, in that the operation of the electromagnetically actuated control valves 58 is controlled via a conduit 62. A manual specification of the driving speed, for example, for the headland or travelling on the road is possible by means of a joystick 44, on whose upper end operating elements 46 are located, which, for example, are used for the specification of the level of the harvest attachment 16, which is adjusted by means of an actuator 48.

The control 42 is connected to a contactless operating range finder 70 via another conduit; the range finder in this embodiment example is used as the apparatus for the predictive, contactless recording of a crop planting 96 that is ahead of the harvester 10, and for the preparation of the data regarding an expected mass throughput in the harvester 10, and comprises a sender 92 and a recipient 94, and is affixed on the upper side of the cabin 35. During operation, the sender 92 irradiates electromagnetic waves in the radar frequency range, at an incline and forward onto the crop planting 96 on the field in front of the combine thresher 10. The recipient 94 receives waves reflected from the crop planting 96 and perhaps from the ground. An evaluating unit 98, which could also be integrated into the control 42, evaluates the running times and amplitudes of the waves received from the recipient 94. Preferably, the polarization of the waves irradiated by the sender 92 is vertical and the receiver 94 receives, separately from one another, horizontally and vertically polarized waves. A suitable frequency is 77 GHz. The range finder 90 can oscillate back and forth around an axis 78, which is approximately vertical or slopes upward and is inclined forward, so as to scan the crop planting 96 via the section width of the crop attachment 16, in a lateral direction, or it can comprise a suitable number of senders 92 and receivers 94, which are situated laterally, next to one another, so as to simultaneously obtain a number of running times and amplitudes via the section width of the crop attachment 16.

The control 42 is also connected to a position determining system 80, receives the signals from satellites (for example, GPS, Galileo, and/or Glonass), and determines the actual position of the combine thresher 10. This position can be used to evaluate, from a card, data regarding an expected mass throughput in the harvester 10, whether from a prior harvesting operation and/or from prior travel over an adjacent field strip.

A speed sensor 60 supplies the control 42 with a speed signal regarding the actual driving speed v of the combine thresher 10. The speed sensor 60 can record the rpm of one of the shafts 54 or be designed as a radar sensor and record the speed of the combine thresher 10 over the ground.

FIG. 2 shows the structure of the control 42 in detail. In addition to the range finder 70 and the evaluating unit 98, it comprises a planning unit 64, which predictively plans the speed of the combine thresher 10. The planning unit 64 sets up reference values for the speed (v(t) ref) of the combine thresher 10, which are dependent on the time t, via the signals of the evaluating unit 98, using a procedure explained below; the values can change over time as a function of the density of the crop planting 96 on the field. In addition to the individual reference value for the speed (v(t) ref), its first and second time derivations at the outlet of the planning unit 64 are also available as output signals of the planning unit. It can also make available higher derivations that depend on the transfer function used in a theoretical value calculation unit 66 and represent the travelling dynamics of the combine thresher 10.

These three reference values are supplied to the theoretical value calculation unit 66, which, at its outlet 68, gives a theoretical value (V(t) theoretical) for the speed. The theoretical calculation unit 66 is used to convert the reference value into the theoretical value for the speed in such a way that the travelling dynamics (transfer function) of the combine thresher 10 are taken into consideration, that is, its acceleration and deceleration behavior. To this end, the reference value for the speed (v(t) ref) and its first and second time derivations can be multiplied with different constants and the products can be added. These constants can be firmly specified or are automatically adapted, in whole or in part, to the individual loading state of the combine thresher 10, in particular, to the filling level (detected by sensors) in the grain tank 28.

The reference value for the speed (v(t) ref) is also added to a subtractor 72, which deducts from this reference value the actual speed that is recorded with the speed sensor 60. This difference is a regulation input value for a regulation switch 74, to whose initial value an adder 76 adds the theoretical value at the outlet 68 of the theoretical calculation unit 66. The result of the adder 76 is then added, as an adjustment value S, to the control valves 58 of the travel drive. Accordingly, one obtains a so-called pilot control, in which the adjustment variable v(t) ref will be acted on with a value v(t) theoretical, independent of the conditions of the regulation path; this makes possible a consideration of the required adjustment variable to be expected as a result of the course of the theoretical value.

Figure 3:
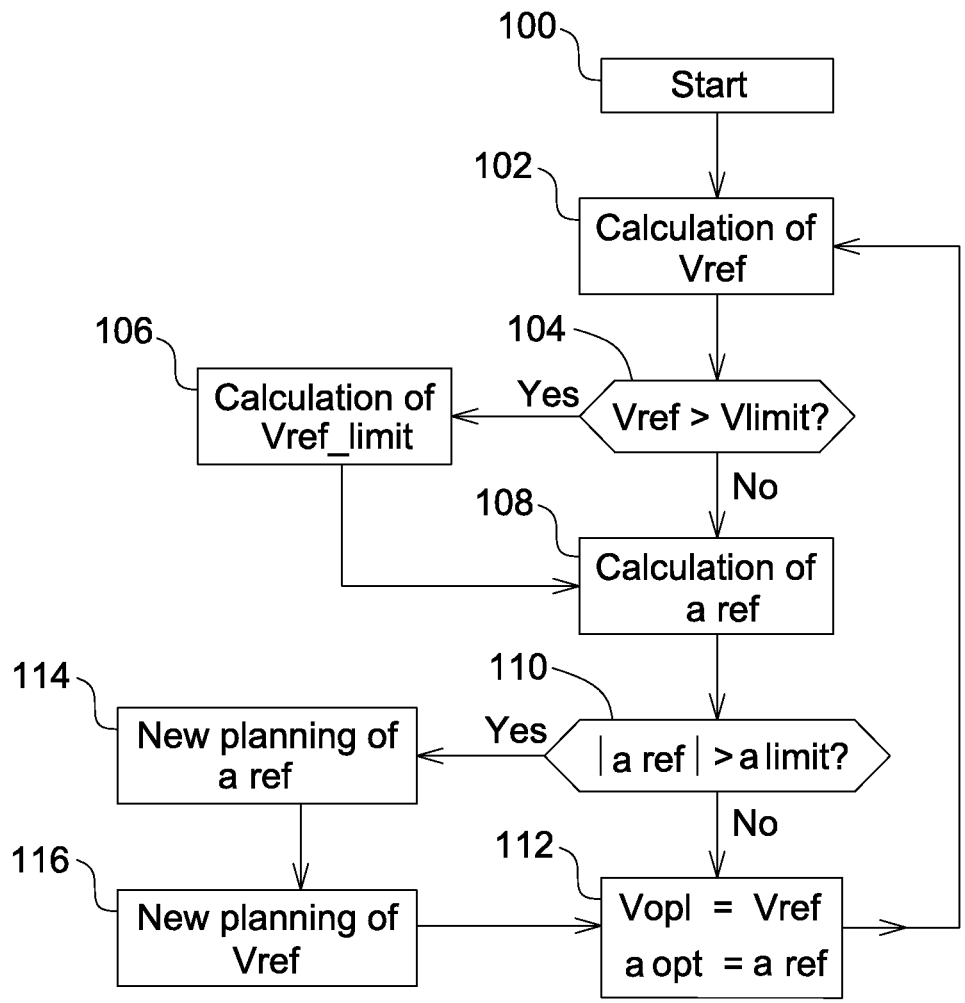
FIG. 3 shows a flow chart according to which the speed specification system operates.

The mode of action of the planning unit 64 is explained below, with the aid of FIG. 3. After the start in step 100, reference values for the speed v(t) ref for a certain time period or path before the combine thresher 10 are initially calculated in a first step 102; they are based on the signals of the evaluation unit 98. With regard to this, reference is made to the state of the art according to DE 101 30 665 A1, whose disclosure is included by reference in the documents under consideration. Alternatively, or additionally, the reference values for the speed v(t) ref can be determined with the aid of a deposited card, in which expected throughputs are stored in a georeferenced manner, which is read off with the aid of the signals of a position determining system 80. In this respect, reference is made to the state of the art according to DE 44 31 824, whose disclosure is included by reference in the documents under consideration. As a result of step 102, therefore, one obtains a speed course v(t) ref, in whose maintenance the combine thresher 10 is acted on with a constant throughput (within the scope of the measurement and regulation accuracy). With small planting densities, the combine thresher 10 would come at very high speeds, and with sudden changes of the planting density, would greatly accelerate or decelerate, which is not comfortable for the operator.

Figure 4:
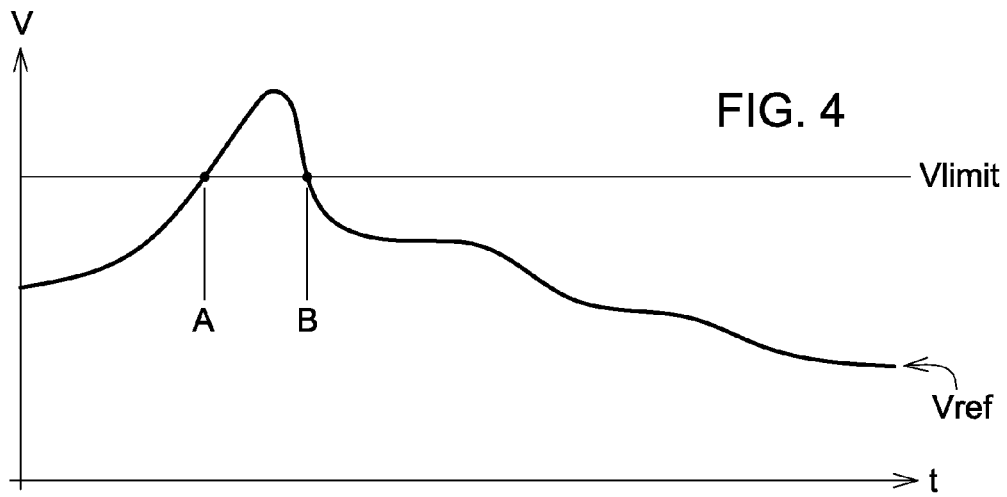
FIG. 4 is a diagram in which a planned speed exceeds a limiting value.
Figure 5:
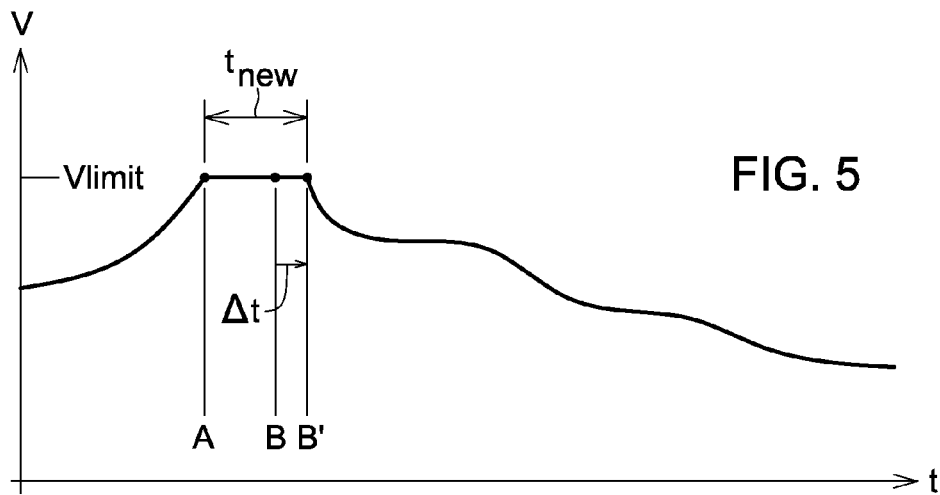
FIG. 5 is a diagram according to a new planning of the speed course of FIG. 4.
Figure 6:
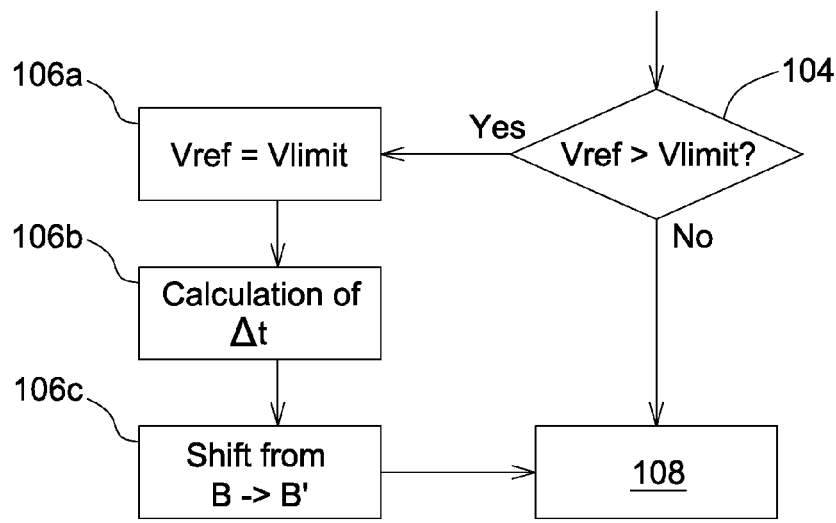
FIG. 6 shows a flow chart for the new planning of the speed course.

In the following step 104, it is inquired whether each of the speeds determined in step 102 is greater than a limiting speed, which can be firmly specified and, for example, be on the order of magnitude of 10 km/h, or can be specified by the joystick 44. If that is the case, step 106 follows, in which a new planning of the time course of the speeds takes place. With the recalling of step 106, accordingly, a situation exists as represented schematically in FIG. 4. The planned speed v ref (t) exceeds, at time A, a prespecified upper limiting value v limit and exceeds it again at a later time B. With the new planning in step 106, therefore, the speed v ref is limited to the value v limit after time A (step 106a in FIG. 6), and the maintenance of this speed is prolonged beyond the time B, by the time Δt, to a time B', since the combine thresher 10 must, in fact, travel more slowly than was originally planned. Accordingly, in a first step 106b, the time Δt is calculated and the time B' is determined in a step 106c. Beyond the time B', then, the curve from step 102 is again used, but pushed back by the time Δt. Step 108 follows step 106 or 106 [sic; probably 106c]; this is also the case if the result of step 104 was negative.

In step 108, the speed course, which is the result of step 102 or 106, is used for the calculation of the acceleration a ref, in that the speed is differentiated over time. Step 110 follows, where the inquiry is made whether the absolute amount of the acceleration a ref is greater than a predetermined maximum value a limit. This maximum value is selected in such a way that the operator of the combine thresher 10 in his cabin 35 is not exposed to excessive, uncomfortable accelerations. Such a maximum value can be, for example, 0.315 m/s$^2$ or correspond to another, in particular, standardized maximum value. If step 110 shows that the maximum value a limit is not exceeded, then step 112 follows, in which the values for v ref and a ref, determined in the preceding steps, are taken over as the initial value and are transferred to the theoretical value calculation unit 66 and to the subtractor 72 (FIG. 2). Step 112 is again followed by step 102, but for speed values that are to be controlled later.

Figure 7:
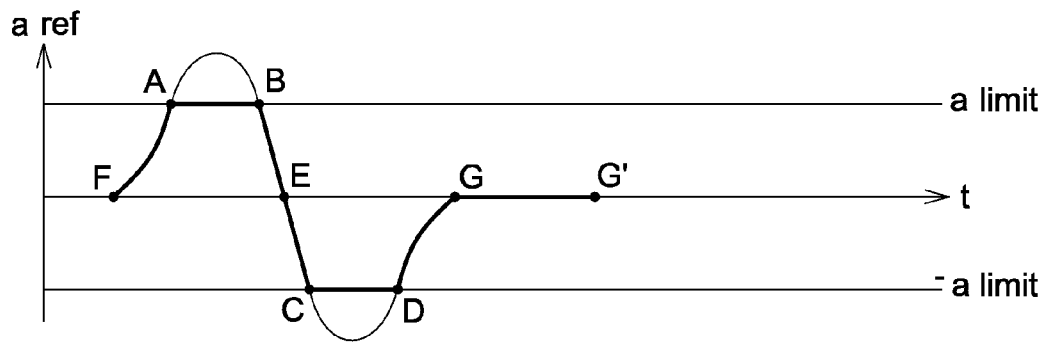
FIG. 7 is a diagram in which the planned acceleration exceeds maximum values.

On the other hand, if the result in step 110 is that the amount of the acceleration a ref is greater than the maximum value, then step 114 follows. With the recalling of step 114, then, there is an acceleration course as is shown, for example, in FIG. 7. The acceleration a ref can become greater than the maximum value a limit with a suddenly thinning crop planting 96 at time A and, again, can go below this maximum value at time B (if the combine thresher 10 has reached its theoretical speed or the planting again thickens). Analogously, the combine thresher 10 can slow down after a time E, if the planting density increases and, at a time C, the (negative) deceleration falls below the negative maximum value a limit, whereas the deceleration at time D again exceeds the negative maximum a limit. One obtains thereby the speed course shown in FIG. 8, in which the speed v ref begins to rise at time F (corresponds to the point before A, at which a ref in FIG. 8 begins to differ from zero); at time E, it is greatest and attains the value v1 and then again declines, so as to once more reach the original value at time G (corresponds to the point after D, at which a ref in FIG. 8 is again zero).

Figure 9:
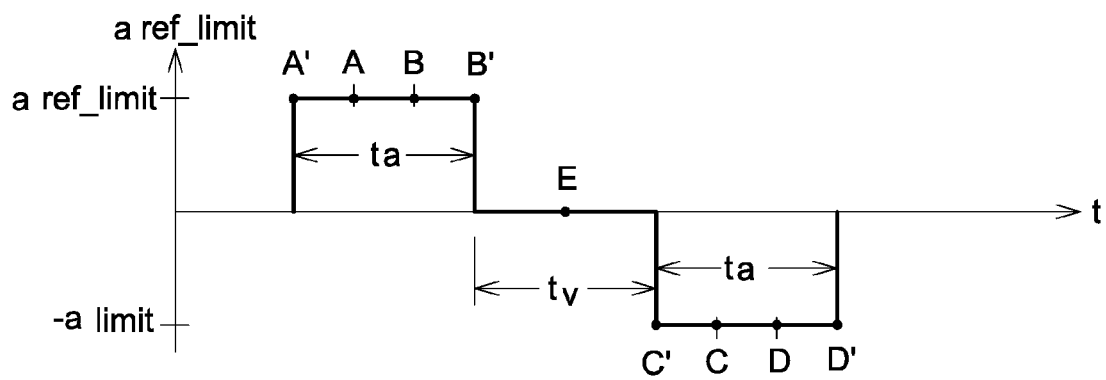
FIG. 9 is a diagram for the new planning of the acceleration.
Figure 10:
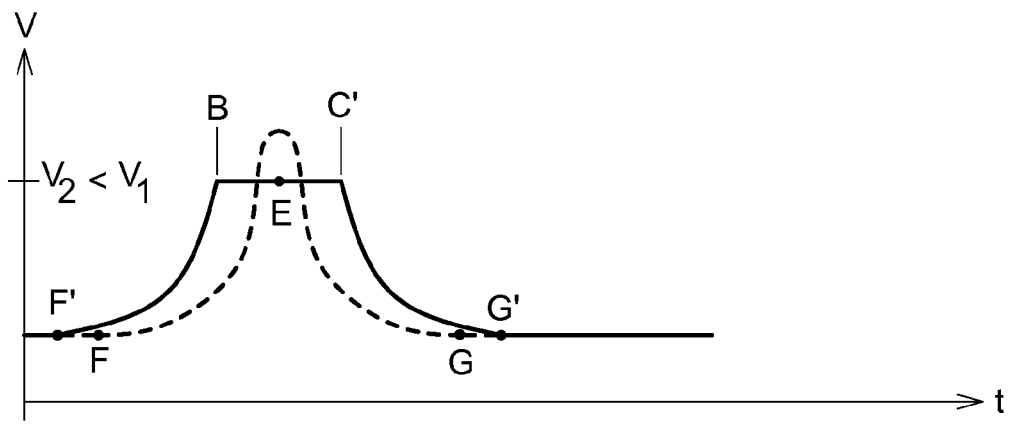
FIG. 10 is a diagram for the new planning of the speed.
Figure 11:
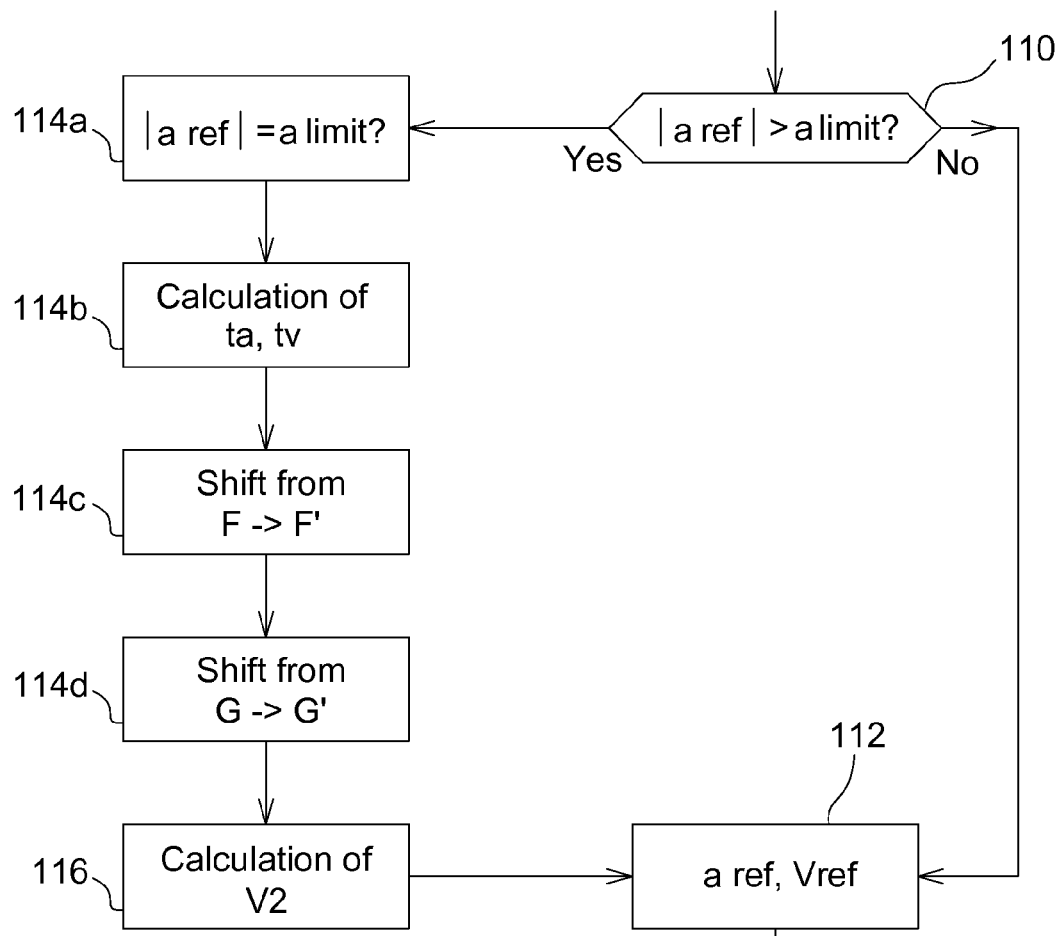
FIG. 11 shows a flow chart for the new planning of the acceleration and speed course.

The procedure in step 114 is, accordingly, such that the acceleration is set at the sign of the planned acceleration (+1 with acceleration; −1 with deceleration), multiplied by the maximum acceleration a limit (step 114a in FIG. 11), and the times A and B are placed, forward or backward, at times A' and B', so that the acceleration a ref does not exceed the maximum value, as shown in FIG. 9 and FIG. 11. This is analogously valid also for the times C and D, which are placed, forward and backward, on times C' and D', see FIG. 9. The acceleration is set on the maximum value a limit between the times A' and B' at the minimum value −a limit between C' and D'. In this regard, reference is made in FIG. 11 to step 114b, in which, on the one hand, times t a are determined for the acceleration and deceleration phases in accordance with the maximum values, and, on the other hand, a time t v is determined for the time where there is no acceleration. These times are used in steps 114c and 114d to move the times F and G forward or backward to F' and G', as shown in FIG. 10.

Figure 8:
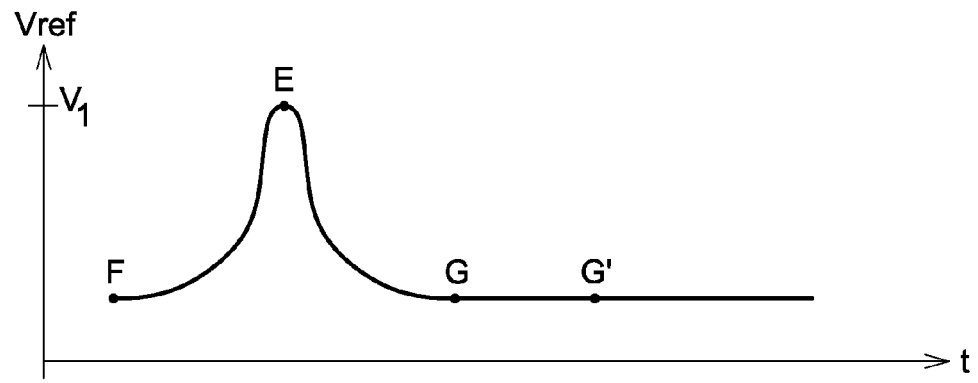
FIG. 8 is a diagram for the new planning of the acceleration.

Since the accelerations were modified in step 114 in comparison to the original planning, a new planning of the speed takes place in step 116. In this regard, reference is made to FIG. 10. The beginning of the acceleration process was moved up from F to F' and its end was moved back from G to G'. The originally planned curve according to FIG. 8 is drawn in as a broken line. The time G' is selected in such a way that after the new planning at time G', it was precisely the same path as that covered at time G of the original planning.

The time G' can be calculated by a double time integration of the calculated speed over time. In the case under consideration, the maximum attained speed v2 is smaller than the maximum speed v1, originally attained according to FIG. 8. This means that the speed specification signals that were planned for after time G come to use later in time, since the newly planned process has a longer duration between the times F' and G' (because of the smaller, newly planned accelerations and speeds) than the originally planned process between times F and G. Step 112 follows step 116.

After the new planning, another examination could take place between steps 112 and 102 as to whether with the newly planned speed course, an exceeding of the maximum crop throughput is to be expected at all or by a specifiable extent (by the operator or because of the manufacturer). Should that be the case, the new planning would be repeated, wherein the speeds are to be correspondingly reduced.

It should also be noted that various changes of the procedure in accordance with the invention are conceivable. Thus, the acceleration courses resulting after the new planning are rectangular in FIG. 9. Instead of this, acceleration courses of FIG. 9 could also be trapezoidal, that is, the absolute value of the acceleration could rise linearly with time until point A' or C' is attained, and could again decline in the same manner at point B' or D'. Instead of the linear rise, any other courses would also be conceivable, such as square, logarithmic, or exponential rises.

What is claimed is:

1. A method for the speed control of a harvester, the method comprising:
    specifying a desired throughput of the harvester;
    predictively determining at least one of:
    a density of a crop planting in a field; or
    a value depending on the density of the crop planting in the field;
    predictively planning a speed specification signal for the harvester;
    wherein with the predictive planning of the speed specification signal, the desired throughput of the harvester is attempted to be maintained while an acceleration of the harvester resulting from the speed specification signal is limited based at least in part on a comfort level of an operator of the harvester; and controlling the speed of the harvester based on the speed specification signal.

2. The method according to claim 1, wherein the predictive planning of the speed specification signal comprises:

a first step, in which the speed specification signal is planned only on the basis of at least one of the density of the crop or a value dependent thereon; and a second step, in which a new planning of the speed specification signal takes place if at least one of:

the amount of the acceleration of the harvester planned in the first step exceeds a stipulated threshold value; or the speed of the harvester planned in the first step exceeds a stipulated maximum speed of the harvester.

3. The method according to claim 2, wherein the predictive planning of the speed specification signal is based at least in part on a maximum speed of the harvester.

4. The method according to claim 2, wherein the predictive planning of the speed specification signal comprises a time move of a speed change forward or backward so as to prevent exceeding a threshold value of the acceleration or speed of the harvester, wherein the speed specification signals following the new planning in time are moved back in time.

5. The method according to claim 2, further comprising using a maximum acceleration or speed in response to the new planning of the speed specification signal originally exceeding a maximum acceleration or speed respectively.

6. An apparatus for the speed control of a harvester, the apparatus comprising:

a specifying device that specifies a desired throughput of the harvester;

a device for predictive determination of:

a density of a crop planting in the field; or a value dependent on the density of the crop planting in the field;

a planning device for predictive planning of a speed specification signal for the harvester;

wherein the planning device is operable to limit, with the predictive planning of the speed specification signal, the accelerations of the harvester resulting from the speed specification signal to an extent that is comfortable for an operator of the harvester while the desired throughput of the harvester is attempted to be maintained; and means for controlling the speed of the harvester based on the speed specification signal.

7. The apparatus according to claim 6, wherein the means for controlling the speed of the harvester comprises:

a regulation switch operatively coupled to the planning device and having an initial value that is determined based on a reference value (V(t) ref) of the speed of the harvester which is supplied by the planning device and an actual value of the speed of the harvester which is supplied by a speed sensor; and a theoretical calculation unit operatively coupled to the planning device and the regulation switch and having an initial value that is added to the initial value of the regulation switch to form an adjustment value that is provided to at least one control value to adjust the speed of the harvester, so as to take into consideration travelling dynamics of the harvester.

8. The apparatus according to claim 7, wherein the apparatus is part of the harvester.

9. The apparatus according to claim 7, wherein the initial value of the regulation switch is determined by subtracting the actual value of the speed of the harvester from the reference value (V(t) ref) of the speed of the harvester.

* * * * *